US011927099B2

(12) United States Patent
Rizzo et al.

(10) Patent No.: US 11,927,099 B2
(45) Date of Patent: Mar. 12, 2024

(54) COMPOSITE SEAL STRUCTURE FOR A MACHINE, AND METHOD OF MANUFACTURING THE COMPOSITE SEAL STRUCTURE

(71) Applicant: NUOVO PIGNONE TECNOLOGIE—S.R.L., Florence (IT)

(72) Inventors: Emanuele Rizzo, Florence (IT); Massimiliano Tempestini, Florence (IT)

(73) Assignee: Nuovo Pignone Tecnologie—S.R.L., Florence (IT)

( * ) Notice: Subject to any disclaimer, the term of this patent is extended or adjusted under 35 U.S.C. 154(b) by 0 days.

(21) Appl. No.: 17/756,993

(22) PCT Filed: Nov. 27, 2020

(86) PCT No.: PCT/EP2020/025545
§ 371 (c)(1),
(2) Date: Jun. 7, 2022

(87) PCT Pub. No.: WO2021/115626
PCT Pub. Date: Jun. 17, 2021

(65) Prior Publication Data
US 2023/0019443 A1    Jan. 19, 2023

(30) Foreign Application Priority Data

Dec. 12, 2019   (IT) ........................ 102019000023850

(51) Int. Cl.
*F01D 11/02*     (2006.01)
*F01D 25/24*     (2006.01)

(52) U.S. Cl.
CPC ............ *F01D 11/02* (2013.01); *F01D 25/246* (2013.01); *F05D 2230/64* (2013.01);
(Continued)

(58) Field of Classification Search
CPC ...... F01D 11/001; F01D 11/02; F01D 11/003; F01D 11/005; F01D 11/08; F01D 25/24;
(Continued)

(56) References Cited

U.S. PATENT DOCUMENTS 3,867,060 A * 2/1975 Huber ..................... F01D 11/08
                                                            415/173.5
5,749,227 A * 5/1998 Smith ..................... F01D 11/00
                                                                 60/657

(Continued)

FOREIGN PATENT DOCUMENTS

EP            0623768 A1    11/1994
EP            2154335 A1     2/2010
EP            3106620 A1    12/2016

*Primary Examiner* — Brian P Wolcott
*Assistant Examiner* — Maxime M Adjagbe
(74) *Attorney, Agent, or Firm* — Paul Frank + Collins P.C.

(57) ABSTRACT

The composite seal structure includes a carrier ring and a seal element housed in an annular groove formed between a circumferential outer wall and two side walls of the carrier ring. The seal element has a first region in surface-to-surface contact with the annular groove and a second, seal-ing region protruding from the annular groove. A fastening arrangement couples the seal element and the carrier ring to one another. The fastening arrangement comprises a plurality of fastening pins circumferentially arranged around the axis of the carrier ring. Also disclosed is a method for manufacturing the seal structure.

22 Claims, 5 Drawing Sheets

(52) U.S. Cl.
CPC ...... *F05D 2240/59* (2013.01); *F05D 2260/31* (2013.01); *F05D 2260/36* (2013.01)

(58) Field of Classification Search
CPC .. F01D 25/243; F01D 25/246; F05D 2240/11; F05D 2240/55; F16J 15/447
See application file for complete search history.

(56) References Cited

U.S. PATENT DOCUMENTS

| | | | |
|---|---|---|---|
| 6,471,213 B1* | 10/2002 | Yuri | F16J 15/3288 |
| | | | 277/355 |
| 2015/0086343 A1* | 3/2015 | Rizzo | F16J 15/44 |
| | | | 415/173.5 |
| 2016/0258304 A1 | 9/2016 | Sippel et al. | |
| 2017/0145847 A1* | 5/2017 | Zhang | F16J 15/445 |
| 2018/0100514 A1 | 4/2018 | Venkataraman et al. | |
| 2018/0363506 A1* | 12/2018 | Tesson | F01D 25/005 |
| 2019/0101027 A1* | 4/2019 | Lepretre | F01D 25/243 |
| 2020/0095893 A1* | 3/2020 | Blaney | C04B 35/80 |

\* cited by examiner

COMPOSITE SEAL STRUCTURE FOR A MACHINE, AND METHOD OF MANUFACTURING THE COMPOSITE SEAL STRUCTURE

TECHNICAL FIELD

The present disclosure relates to seal structures for sealing a sealing region between a stationary part and a rotary part of a machine, in particular a turbomachine, such as a centrifugal or axial compressor, a turbine, a turbo-expander or the like. Embodiments disclosed herein specifically concern a labyrinth seal.

BACKGROUND ART

Rotary machines, such as turbomachines, include machine portions where different fluid pressures are present. In order to prevent or limit fluid leakages from a high-pressure area to a low-pressure area in the machine, seals are provided to separate the two areas where different pressures prevail. A typical rotor seal is arranged between a stationary machine component, which is usually integral with the machine casing, and a rotating shaft, which may include a rotating drum, such as a balance drum of a compressor or pump. The rotating shaft extends through the rotor seal assembly, which is stationarily mounted on the stationary machine component and includes sealing members co-acting with the rotating shaft to prevent or reduce fluid leakage.

Typical rotor seals include labyrinth seals, damper or hole-pattern seals, honeycomb seals, pocketed damper seals, abradable seals, and the like.

Some rotor seals include a carrier ring coupled to a seal element. The carrier ring is usually made of metal, is mounted on the stationary part of the machine and operates as a holder for the seal element, which is designed as an insert applied into an annular groove formed in the holder. The seal element is usually made of a suitable polymer, such as a thermoplastic polymer. Seal structures of this kind are sometimes referred to as "composite seals".

The seal element projects radially inwardly from the annular groove in the carrier ring and includes sealing features, such as fins, also referred to as teeth or knives, of a labyrinth seal, which co-act with the rotating part of the machine to provide a sealing action. Opposite the sealing features, the seal element is in surface contact with the inner surface of the annular groove of the carrier ring.

One critical aspect of this kind of seal structure is the reliability of the coupling between the carrier ring and the seal element. Since a pressure difference exits across the two opposing sides of the seal structure, high-pressure fluid from the high pressure side tends to leak through the gap between the carrier ring and the seal element and may reach the bottom of the annular groove. When this happens, the pressure which acts radially inwardly against the seal element may cause the seal element to deform and detach from the carrier ring.

A more effective mechanical coupling between the carrier ring and the seal element in a composite seal structure would be beneficial to achieve better sealing performances and more reliable seal structures.

SUMMARY

According to an aspect, a seal structure is disclosed, including a carrier ring having a circumferential outer wall, a first side wall and a second side wall. The first side wall and the second side wall protrude radially inwardly from the circumferential outer wall towards a centerline, i.e. an axis, of the carrier ring. The axis or centerline of the carrier ring coincides with the centerline or axis of the seal structure as a whole. The carrier ring further includes an annular groove formed between the circumferential outer wall, the first side wall and the second side wall. The seal structure further includes a seal element having a first region in surface-to-surface contact with the annular groove and a second, sealing region protruding from the annular groove of the carrier ring toward the centerline of the carrier ring. Moreover, a fastening arrangement formed in the seal structure, is adapted to couple the seal element and the carrier ring to one another. According to embodiments disclosed herein, the fastening arrangement includes a plurality of fastening pins circumferentially arranged around the axis of the carrier ring, extending through at least one of the first side wall and second side wall and each engaging in a corresponding seat formed in the seal element.

The pins provide a safe mechanical coupling between the carrier ring and the seal element.

As understood herein, a carrier ring is usually a monolithic component of annular shape, i.e. component made of a single piece, for instance machined from a single blank.

As understood herein, the seal element is usually an annular, i.e. ring-shaped single piece, i.e. monolithic component, for instance machined from a tubular blank.

In embodiments of the composite seal disclosed herein, the pins provide an efficient coupling between the seal element and the carrier ring, such that radial inward deformations due to pressurized gas leakages are prevented or efficiently reduced.

According to a further aspect, a method for manufacturing a seal structure is disclosed. The method includes a first step of inserting a seal element in an annular groove of a carrier ring. The annular groove is formed between a circumferential outer wall, a first side wall, and a second side wall of the carrier ring, the first side wall and the second side wall protruding radially inwardly from the circumferential outer wall towards a centerline of the carrier ring. After insertion of the seal element in the annular groove of the carrier ring, the seal element is mechanically coupled to the carrier ring, such that the seal element has a first region in surface-to-surface contact with the annular groove and a second, sealing region protruding from the annular groove of the carrier ring toward the centerline of the carrier ring. Thereafter, an inwardly facing surface of the second, sealing region of the seal element is machined to produce sealing features thereon.

Further features and embodiments of the seal structure and of the method of manufacturing are set forth in the appended claims and are further described in the following description of exemplary embodiments.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION

A new and useful seal structure, specifically for a rotor seal, is disclosed herein. The seal structure includes an annular holder, referred to herein as "carrier ring", which has an annular groove housing an annular insert, referred to herein as a "seal element". The seal element is mechanically coupled to the carrier ring by means of a plurality of pins distributed around the axis of the seal structure and preferably extending parallel to the axis or centerline of the seal structure. As will be explained later on with reference to the detailed description of embodiments, the resulting fastening arrangement prevents or limits radial deformation of the seal element. The particular manner of fastening the seal element to the carrier ring also allows novel and useful methods of manufacturing the seal structure, which can save time and costs, resulting in a seal structure of high precision and efficiency.

While the following description focusses on labyrinth seals, the novel features of the seal structure disclosed herein can be used with advantage also in other types of rotor seals, i.e. seals adapted to co-act with a rotating member of a machine. For instance, the features of the seal structure specifically concerning the mechanical coupling between the seal element and the carrier ring can be used also in abradable seals, honeycomb seals or other seals as recalled in the introductory part of the present specification. In general, features disclosed herein can be used in combined seal structures including a carrier ring and an annular seal element coupled to the carrier ring and projecting therefrom radially inwardly with a sealing region designed for co-action with a shaft or drum.

Figure 1:
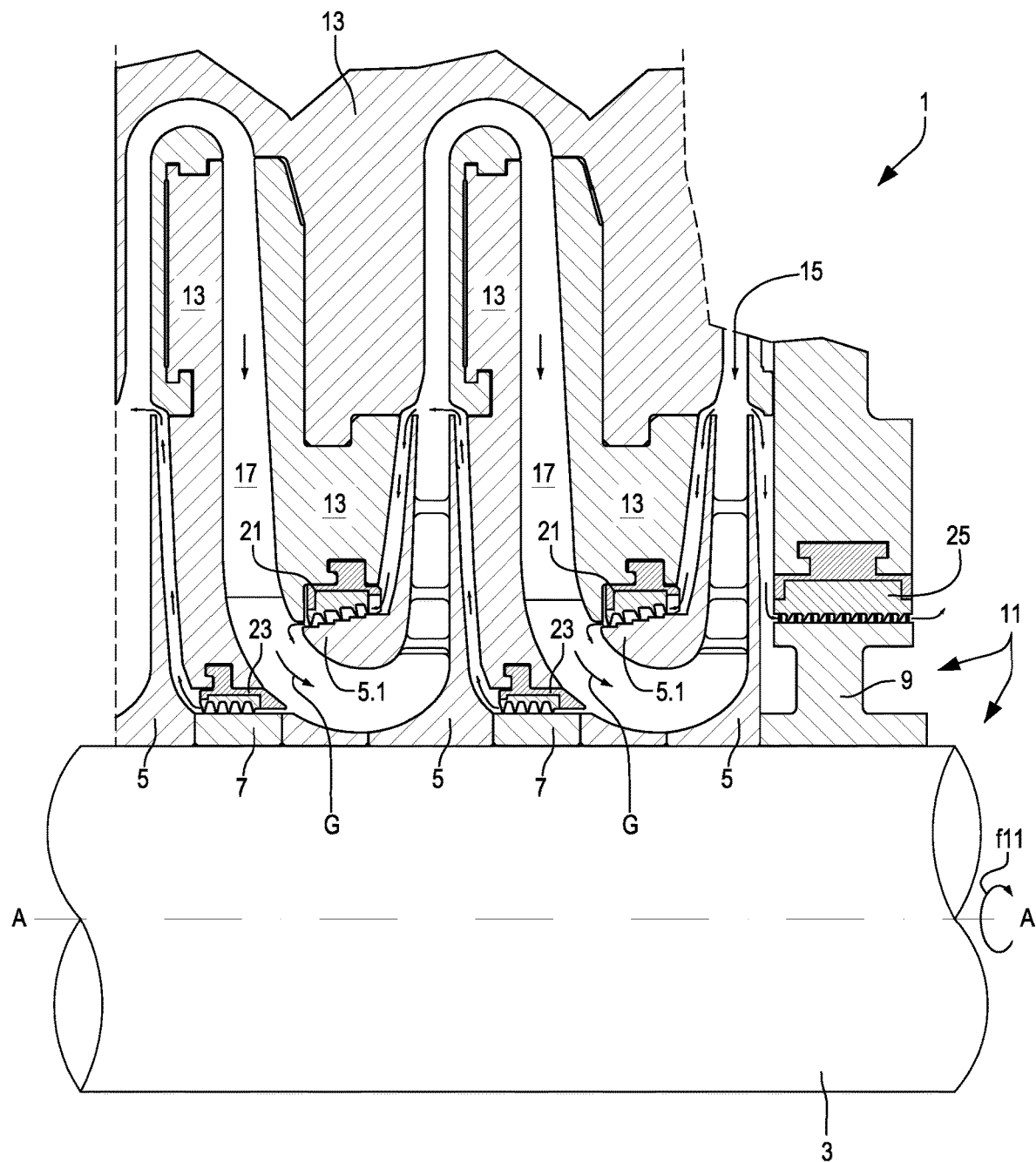
FIG. 1 illustrates a schematic cross-sectional view of a centrifugal compressor including a plurality of rotor seals, which can include respective seal structures according to the present disclosure.

Turning now to the drawings, FIG. 1 illustrates a schematic sectional view of a centrifugal compressor L The sectional view is taken along a plane containing the rotation axis A-A of the compressor rotor. The section of FIG. 1 illustrates only a portion of the centrifugal compressor, sufficient for the purposes of the present description.

The centrifugal compressor 1 of FIG. 1 is presented here as an exemplary embodiment of a turbomachine, in which the seal structure of the present disclosure can be advantageously applied. Those skilled in the art of turbomachines will, nevertheless, understand that the seal structure disclosed herein can be applied also to different kinds of turbomachines, and in different positions of the turbomachine. In general, the seal structure can be used whenever sealing around a rotating member, such as a rotor, drum or shaft, between a high pressure area and a low pressure area, is required.

The centrifugal compressor 1 includes a shaft 3 and one or more impellers 5. In FIG. 1 three impellers 5 are illustrated. While in FIG. 1 the impellers 5 are mounted on the shaft 3 for co-rotation therewith in a so-called shrink-fit arrangement, in other embodiments the impellers can be configured as so-called stack-impellers, which are axially stacked and torsionally coupled to one another the aid of a tie-beam and respective Hirth coupling or other coupling features.

In the embodiment of FIG. 1 a distancing ring 7 is arranged between each pair of adjacent impellers 5. A balance drum 9 s further keyed on shaft 3 for rotation therewith. The shaft 3, the impellers 5, the distancing rings 7 and the balance drum 9 form together a rotor 11, which is mounted for rotation around rotation axis A-A according to arrow f11. The rotor 11 is housed in a casing (not shown), wherein the stationary components of the compressor 1 are housed. The stationary components include diaphragms 13 defining diffusers 15 and return channels 17 of the compressor.

Each impeller includes an impeller eye 5.1. By way of illustration, an eye labyrinth seal 21 is positioned around each impeller eye 5.1 to reduce gas leakages from the high-pressure side downstream of the impeller to the low-pressure side upstream the impeller. The terms "upstream" and "downstream" are referred to the direction of flow of the process gas through the compressor 1, which is schematically represented by arrows G. Each labyrinth seal 21 is mounted in a housing machined in the respective diaphragm of the centrifugal compressor 1.

Shaft labyrinth seals 23 are further provided between diaphragms 13 and the shaft 3, for instance around the distancing rings 7. The shaft labyrinth seals 23 are mounted in respective housings machined in the diaphragms 13.

In the embodiment of FIG. 1, a balance drum labyrinth seal 25 is also disposed around the balance drum 9.

One, some or all the labyrinth seals 21, 23, 25 of the centrifugal compressor 1 can be configured according to the present disclosure. Here below, referring to FIGS. 2 and 3, an embodiment of a generic labyrinth seal is described, to illustrate the novel features thereof. Those skilled in sealing technology will be capable of designing labyrinth seals for different uses and different parts within the centrifugal compressor 1, or another turbomachine, embodying the features described below.

Figure 2:
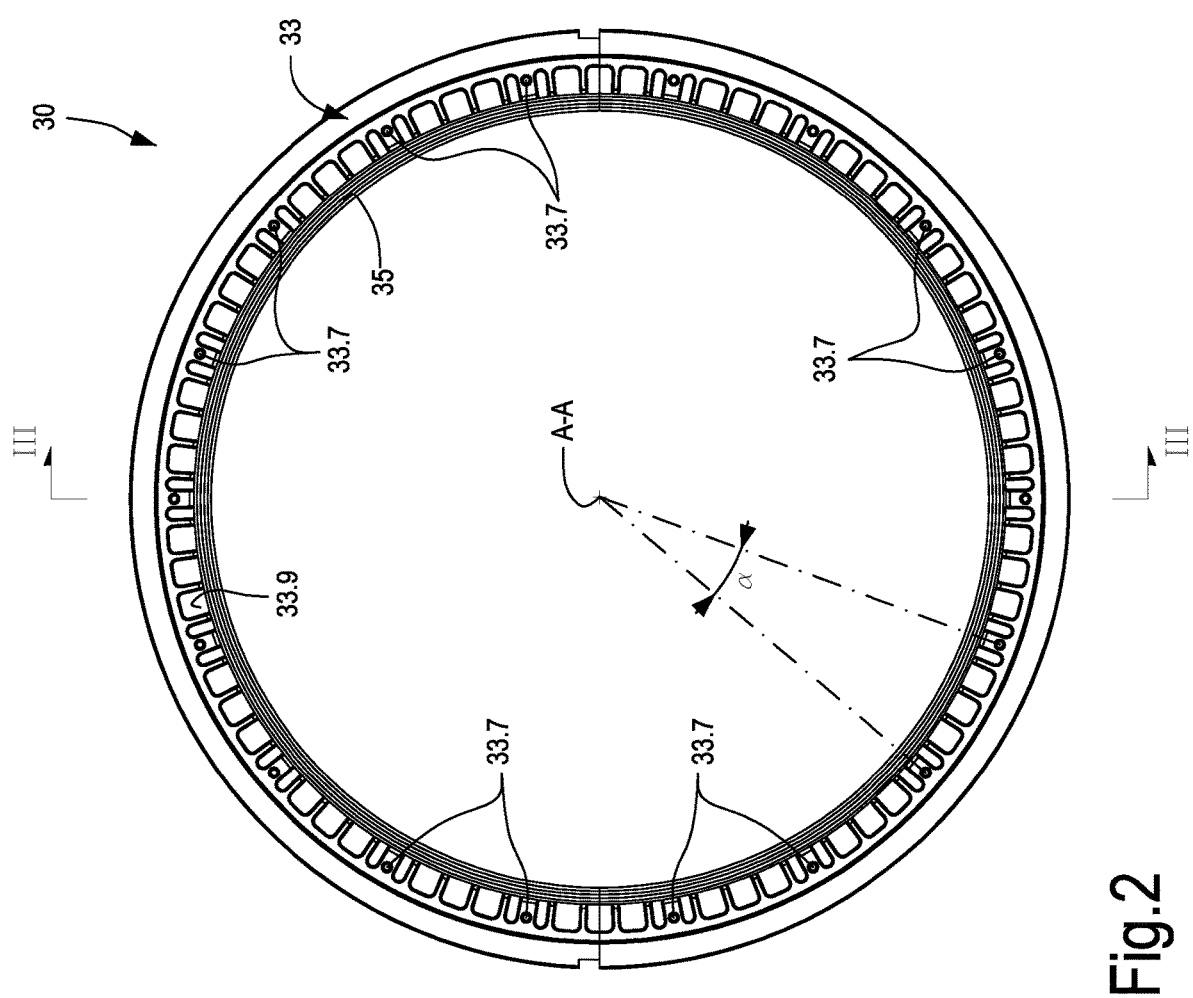
FIG. 2 illustrates a seal structure according to the present disclosure according to a view in a direction parallel to the axis of the seal structure.

FIG. 2 illustrates an exemplary seal structure 30, which can be used in the eye labyrinth seal 21, in the shaft labyrinth seal 23, in the balance drum labyrinth seal 25, or more generally in any different rotor seal within a turbomachine.

The labyrinth seal 30 includes a carrier ring 33 and a ring-shaped seal element 35. The axis or centerline of the seal arrangement is labeled A-A and coincides with the rotation axis of the compressor rotor 11 when the seal structure is mounted in the turbomachine around the compressor rotor 11.

The carrier ring 33 can be made of a metal or a metal alloy. The material used for manufacturing the carrier ring 33 can be selected based on the nature of the process gas, which will get in contact with the seal arrangement 30, on the pressures on the two sides of the seal arrangement, on the dimension of the seal, and on other design considerations. For instance, generally in normal, sweet and sour environments with low acidity the following alloys can be employed: aluminum alloys of the series 2000, one example of which is AVIONAL® 14; or aluminum alloys of the series 5000, one example of which is PERALUMAN®, where AVIONAL and PERALUMAN are a trademarks registered to Constellium Valais SA, Switzerland; or aluminum alloys of the series 6000, one example of which is ANTI-CORODAL®, where ANTICORODAL is a trademark registered to Novelis Switzerland SA, Switzerland, and martensitic stainless steels. In nom al environment, carbon steel and low alloy steel can be used. In acid environments austenitic, superaustenitic, duplex and superduplex stainless steels as well Ni-based alloys can be employed. As good design practice, the carrier ring should be made of the same material of the diaphragm.

The seal element 35 can be made mainly of a thermoplastic polymer. For instance, the seal element 35 can be made of a composite polymeric material having a polymer matrix filled with reinforcing fibers or particles, such as carbon fibers, glass fibers, or the like. Polymers like PEK (polyether ketone), PEEK (polyether ether ketone), PAI (polyamide-imides), PEI (polyethylenimine) and PFA (perfluoroalkoxy alkanes) can be used as options. Reinforcing fibers can be long or shorts (<30 µm) depending on the required mechanical characteristics or on the available technology.

Figure 3:
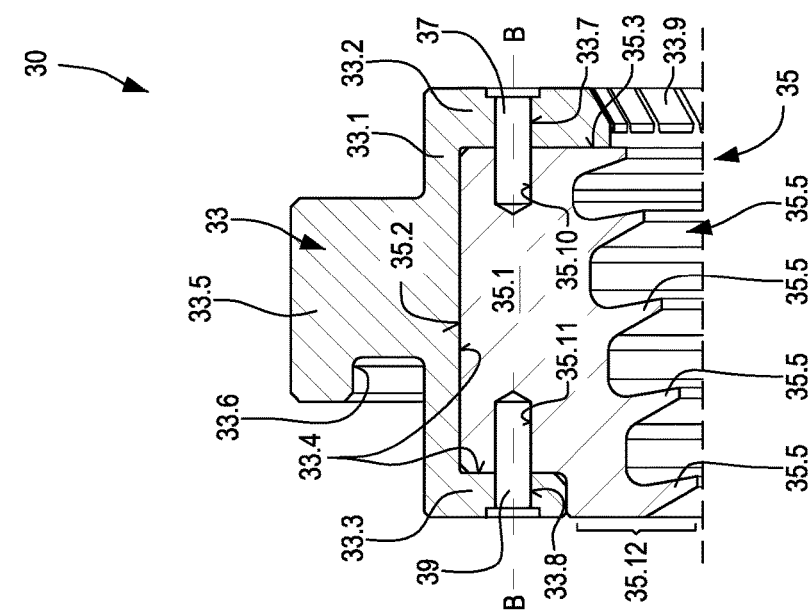
FIG. 3 illustrates an enlarged cross-sectional view of one embodiment according to line in FIG. 2.

With continuing reference to FIG. 2, FIG. 3 shows an enlarged cross-section of the carrier ring 33 and of the seal element 35.

The carrier ring 33 includes a circumferential outer wall 33.1, a first side wall 33.2 and a second side wall 33.3. The circumferential outer wall 33.1, the first side wall 33.2 and the second side wall 33.3 form an annular groove 33.4 therebetween, which houses the seal element 35.

In the embodiment of FIGS. 2 and 3, the circumferential outer wall 33.1 has a broadly cylindrical shape. The inner surface of the circumferential outer wall 33.1 forms the bottom of the annular groove 33.4. The outer surface of the circumferential outer wall 33.1 forms a fastening feature 33.5 for coupling to an annular seat formed in a stationary member of the turbomachine, for example the compressor diaphragm, in which the seal structure 30 is mounted. In the embodiment of FIGS. 2 and 3 the fastening feature includes an annular projection extending from the outer peripheral surface of the circumferential outer wall 33.1. The projection has a cross-sectional shape forming an undercut 33.6 for mechanical coupling to the annular seat in the turbomachine.

Each of the side walls 33.2 and 33.3 includes an inner surface, which can be substantially planar and orthogonal to the centerline or axis A-A of the sealing structure. The inner surfaces of the side walls 33.2 and 33.3 extend radially inwardly from the inner surface of the circumferential outer wall 33.1 and form the flanks of the annular groove 33.4. Each side wall 33.2 and 33.3 further includes a respective outer surface, which can be substantially parallel to the respective inner surface and can be substantially planar. In some embodiments, on one or both the external surfaces of the side walls 33.2 and 33.3 swirl breakers 33.9 can be provided.

The first side wall 33.2 is manufactured to have a first set of through holes 33.7 extending from the outer surface to the inner surface of the first side wall 33.2. Similarly, the second side wall 33.3 has a second set through holes 33.8 extending from the outer surface to the inner surface of the second side wall 33.3.

The seal element 35 includes a main body 35.1 with an external cylindrical surface 35.2 in surface contact with the bottom of the annular groove 33.4. The main body 35.1 further includes side surfaces 35.3 and 35.4 in surface contact with the inner surfaces of the first side wall 33.2 and of the second side wall 33.3, respectively. Thus, the main body 35.1 includes a first region of the seal element, in surface-to-surface contact with the annular groove 33.4 formed in the carrier ring 33.

Moreover, the main body 35.1 includes a second, region, namely a sealing region, arranged radially inwardly of the first region and labeled 35.12. The second, sealing region

35.12 has a plurality of sealing features adapted to co-act with a rotating part of a rotor. In the embodiment of FIGS. 2 and 3 the seal structure 30 features a labyrinth seal and the sealing features include annular teeth, blades or lips 35.5, which project radially inwardly from the carrier ring 33 towards the centerline or axis A-A of the seal structure 30.

A fastening arrangement mechanically couples the carrier ring 33 and the seal element 35 to one another. In the embodiment of FIG. 3 the fastening arrangement includes a first set of fastening pins 37 and a second set of fastening pins 39. Each fastening pin 37 of the first set of fastening pins extends in the through hole 33.7 and has an inwardly oriented end projecting in a seat 35.10 formed in the side surface 35.3 of the seal element 35, which is in surface contact with the side wall 33.2. Each fastening pin 39 of the second set of fastening pins extends in the through hole 33.8, which extends across the second side wall 33.3 and has an inwardly oriented end housed in a seat 35.11 formed in the side surface 35.4 of the seal element 35, which is in surface contact with the side wall 33.3.

The seats 35.10 and 35.11 can be in the form of blind holes drilled in the seal element 35.

In some embodiments, the holes 33.7 and 33.8 as well as the seats 35.10 and are oriented parallel to the axis or centerline A-A of the seal arrangement 30.

In some embodiments, each hole 33.7 and relevant seat 35.10 are collinear with a corresponding hole 33.8 and relevant seat 35.11, such that pairs of fastening pins 37, 39 of the two sets of fastening pins are collinear to one another.

If the seats 35.10, 35.11 are collinear, each seat can have a length which is less than half the thickness of the seal element 35, i.e. less than half the dimension of the seal element 35 in the direction of the centerline, measured between the opposing side surfaces of the seal element 35, where the seats 35.10 and 35.11 are drilled. In FIG. 3 such thickness is indicated as "T". In this way the collinear seats remain separate from one another in the form of two opposing blind holes.

The holes 33.7 can be equidistant from one another. Similarly, the holes 33.8 can be equidistant from one another. For instance, the holes can be arranged according to a constant angular pitch α (see FIG. 2). In some embodiments, the angular pitch α which can be comprised between about 5° and about 45°, preferably between about 10° and about 40°, for instance between about 18° and about 36°. In the embodiment of FIG. 2 the angular pitch α is 20°.

The fastening pins 37, 39 can be locked in the holes 33.7, 33.8 and in the seats 35.10, 35.11 in any suitable way, for instance by gluing, soldering, welding or the like. Gluing may be particularly advantageous, as no heat is applied, which may damage the seal element 35.

The fastening pins 37, 39 provide a reliable coupling between the carrier ring 33 and the seal element 35. The fastening pins 37, 39 provide an effective reaction force opposing a radially inwardly acting pressure, which can be generated by pressurized fluid penetrating the gap between the bottom of the annular groove 33.4 and the external cylindrical surface 35.2 of the seal element 35.

The above described seal structure 30 can be manufactured in a convenient manner according to the method described below, reference being made to the sequence of FIGS. 4A-4G.

Figure 4A:
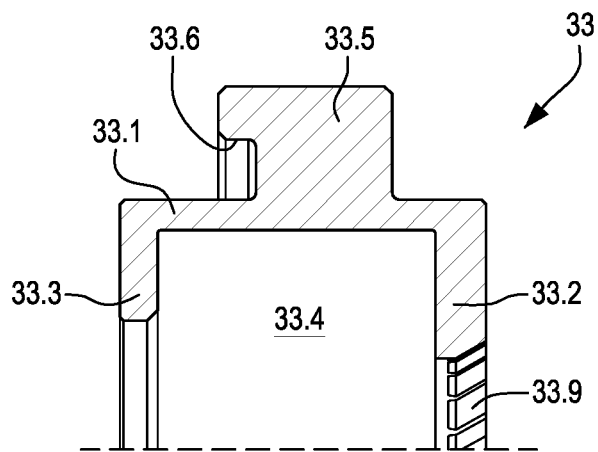
FIGS. 4A, 4B, 4C, 4D, 4E, 4F and 4G illustrate a sequence of steps of a method for manufacturing the seal structure.

The carrier ring 33 can be manufactured by conventional techniques, e.g. by turning, milling or any other chip removal process, starting from a blank, for instance in form of a tube, until the final net shape thereof is achieved, with the exception of through holes 33.7, 33.8, see FIG. 4A. The through holes 33.7, 33.8 are manufactured in a subsequent step, as described hereafter.

Figure 4B:
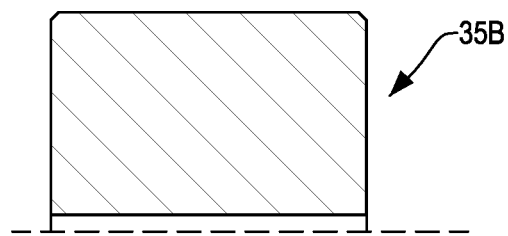
Figure 4C:
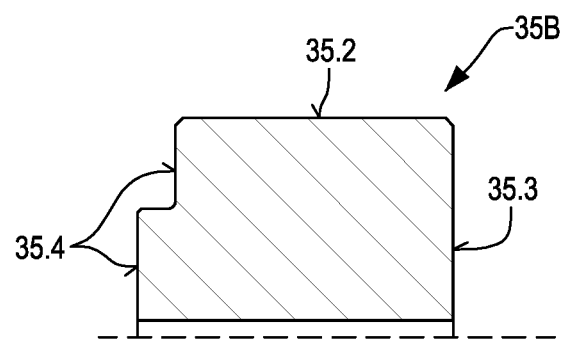

The seal element 35 can be manufactured starting from a blank 35B, shown in a cross-sectional view in FIG. 4B. The blank 35B can have an annular shape, the cross section whereof has a simple square or rectangular shape. The blank 35B can be made by conventional technologies as well as 3D-printing manufacturing technologies.

The blank 35B is then partly machined, e.g. by turning or similar chip-removal procedure, to generate the outer surfaces 35.2, 35.3, 35.4 of the seal element i.e. those surfaces which are intended to be in surface contact with the annular groove 33.4 of the carrier ring 33. See FIG. 4C. The inwardly facing surface on which the sealing features 35.5 are provided will be machined in a subsequent step, which will be disclosed below.

Figure 4D:
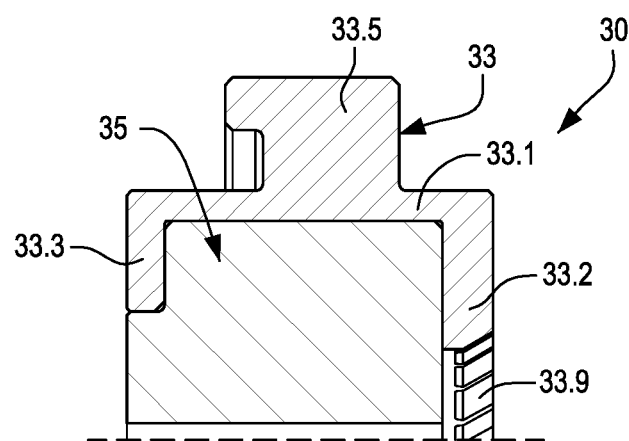
Figure 4E:
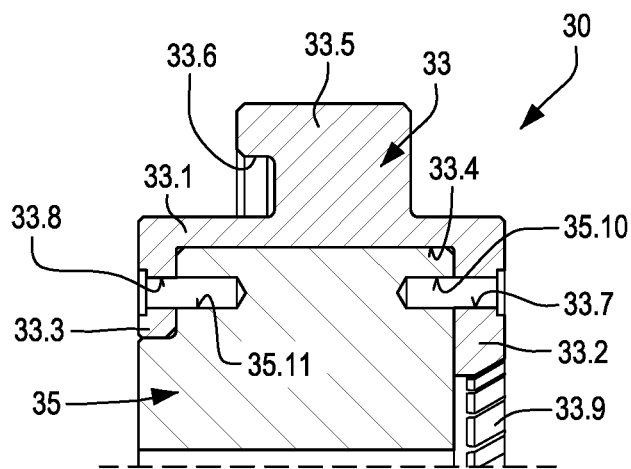

The partly machined seal element 35 is then introduced in the annular groove 33.4 of the carrier ring 33, as shown in FIG. 4D.

In the next manufacturing step, through holes 33.7 and 33.8 are drilled through the side walls 33.2 and 33.3. Drilling is continued to machine the seats 35.10 and 35.11 in the seal element 35.

Figure 4F:
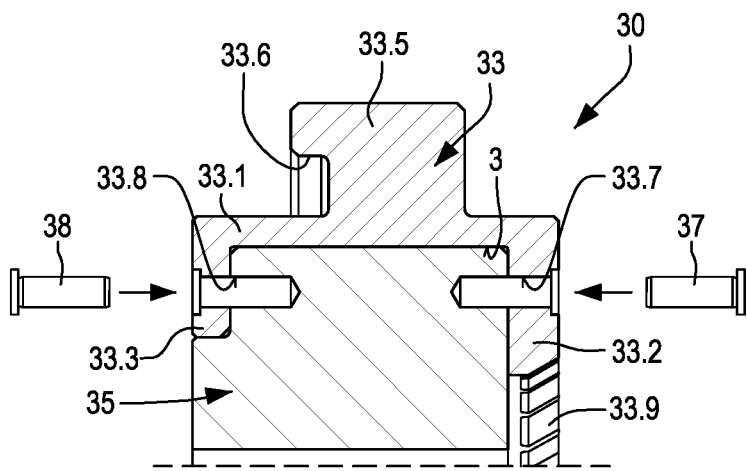

Once the holes 33.7, 33.8 and the seats 35.10, 35.11 have been drilled, the fastening pins 37, 39 are introduced and locked, for instance by gluing, see FIG. 4F.

Figure 4G:
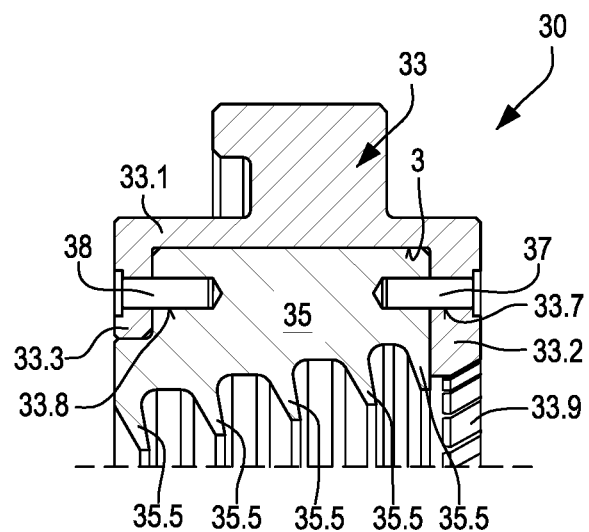

Once the partly machined seal element 35 has been coupled to the carrier ring 33, the second, sealing region 35.12 of the seal element 35 can be machined, by turning, for instance, to achieve the final shape, including the teeth 35.5 or other sealing features, see FIG. 4G.

The process described so far allows very precise machining and reduces the amount of plastic material needed. Deformation of the plastic blank during manufacturing is avoided. Annealing or other heat treatments of the seal element 35 to remove thermally induced stresses can be dispensed with.

Figure 5:
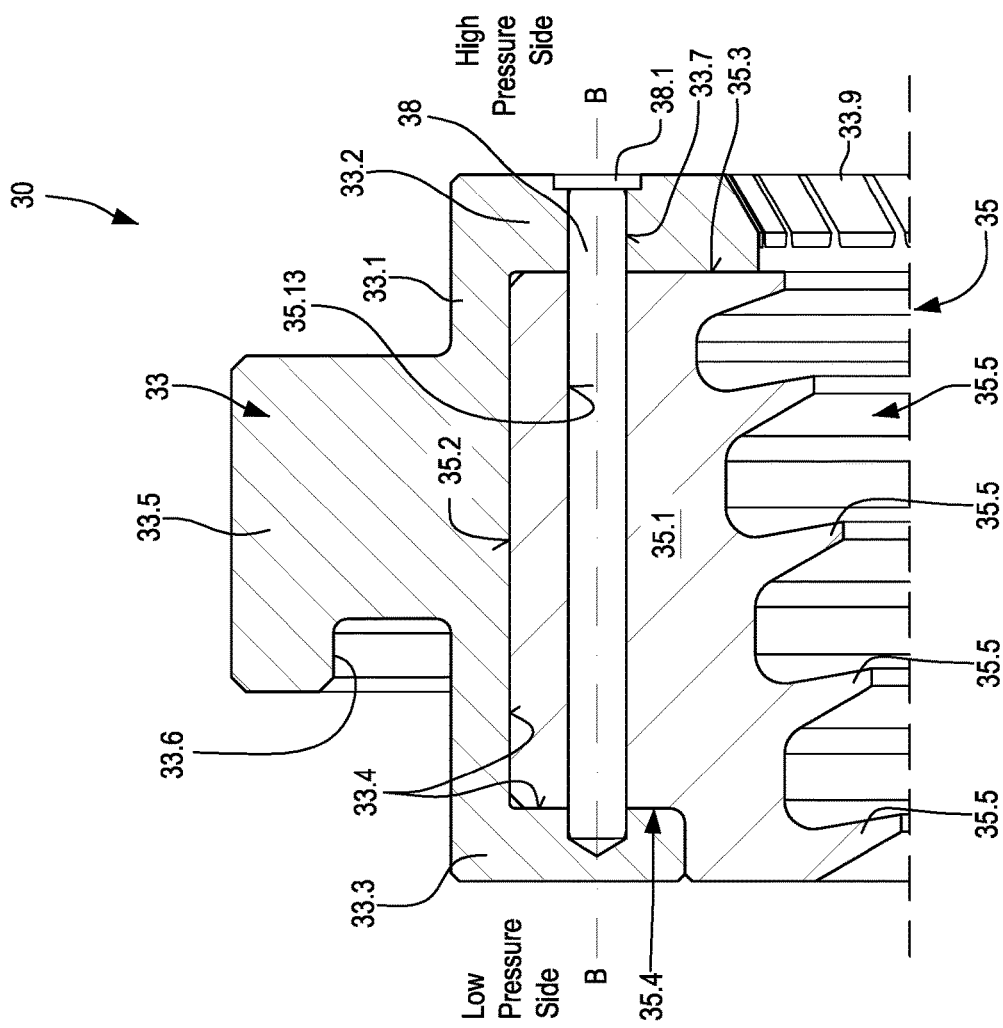
FIG. 5 illustrates an enlarged cross-sectional view according to line in FIG. 2 of a further embodiment.

A modified embodiment of the seal structure 30 is illustrated in FIG. 5. The same reference numbers designate the same or equivalent parts shown in FIGS. 2 and 3 and described above. The main difference between the embodiment of FIGS. 2, 3 and the embodiment of FIG. 5 concerns the fastening arrangement, which mechanically couples the seal element 35 to the carrier ring 33. FIG. 5 illustrates a single set of fastening pins 38. Each pin 38 extends through both side walls 33.2, 33.3, as well as through a seat 35.13 which extends across the whole thickness (i.e. the dimension in the axial direction) of the seal element 35, from side surface 35.3 to side surface 35.4.

To prevent the fastening pins 38 from being pushed out from the seal structure 30 by the pressure differential between a high-pressure area and a low-pressure area, between which the seal arrangement 30 is placed, the fastening pins 38 may be provided with an annular ridge 38.1 abutting against the side of the seal structure 30 facing the high-pressure area, or with any other feature adapted to retain the fastening pins 38 in position against the force resulting from the pressure differential across the seal structure 30.

In some embodiments, one of the holes 33.7, 33.8 can be blind, i.e. restricted to a portion only of the thickness of the relevant side wall, such as not to surface on the side of the machine carrier ring 33 facing the low-pressure area of the machine where the seal structure 30 is mounted. In this way the fastening pins 38 introduced in the blind holes from the high-pressure side will abut against the bottom of the blind holes and will be retained against the force resulting from the pressure differential across the seal structure 30.

In all embodiments disclosed above the seal element 35 is formed by a single integral annular member. While this is particularly advantageous in terms of precision of manufacturing and easy assembling, it is not excluded that the seal element be formed by separate annular portions, which are introduced in the annular groove 33.4 of the carrier ring 33. The several annular portions can then be connected to one another by gluing or in any other suitable manner.

Figure 6:
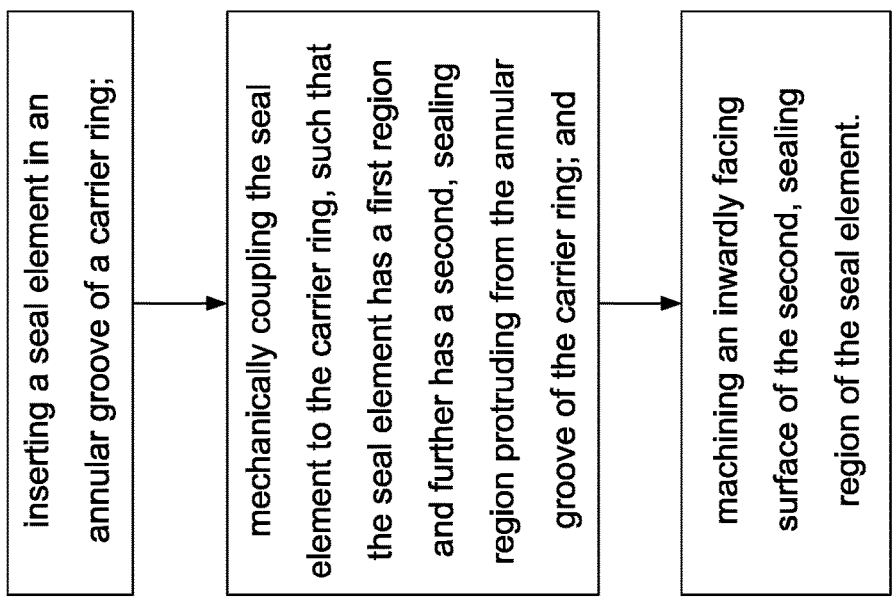
FIG. 6 illustrates a flowchart summarizing a manufacturing method in one embodiment.

FIG. 6 summarizes the main steps of manufacturing methods according to the present disclosure.

While the invention has been described in terms of various specific embodiments, it will be apparent to those of ordinary skill in the art that many modifications, changes, and omissions are possible without departing form the spirit and scope of the claims. In addition, unless specified otherwise herein, the order or sequence of any process or method steps may be varied or re-sequenced according to alternative embodiments.

The invention claimed is:

1. A composite seal structure adapted to be mounted to a turbomachine, the composite seal structure comprising:
   a carrier ring having a center axis and comprising,
      a circumferential outer wall with an inner surface and an outer surface,
      a first side wall and a second side wall protruding radially inwardly from the circumferential outer wall towards the center axis, the first side wall and the second side wall having circumferentially-spaced holes with a counterbore disposed therein,
      wherein the circumferential outer wall, the first side wall, and the second side wall form an annular groove;
   a seal element having a main body with a first region in surface-to-surface contact with the annular groove and a second region protruding from the annular groove of the carrier ring toward the center axis, the seal element having circumferentially-spaced recesses on both sides of the main body, the circumferentially-spaced recess terminating within the main body; and
   a fastening arrangement coupling the seal element and the carrier ring, the fastening arrangement comprising a first set of fastening pins and a second set of fastening pins disposed in and extending through the circumferentially-spaced holes of the first side wall and the second side wall, respectively, the fastening pins having a first end terminating inside of the circumferentially-spaced recesses of the main body of the seal element and a second end with a flange that resides in the counterbore.

2. The seal structure of claim 1, wherein the fastening pins are parallel to the axis of the carrier ring.

3. The seal structure of claim 1, wherein the second region is a labyrinth type sealing region.

4. The seal structure of claim 1, wherein the carrier ring is made of a first material and the seal element is made of a second material that is different from the first material.

5. The seal structure of claim 1, wherein the seal element forms a single ring-shaped element.

6. The seal structure of claim 1, wherein the carrier ring comprises a metal or a metal alloy.

7. The seal structure of claim 1, wherein each fastening pin of the first set is collinear with one of the fastening pins of the second set.

8. The seal structure of claim 1, wherein the inner surface forms a bottom of the annular groove.

9. The seal structure of claim 1, wherein the circumferentially-spaced holes are spaced at an angular distance of from 18° and 36°.

10. The seal structure of claim 1, wherein the circumferential outer wall comprises an annular projection extending from an outer peripheral surface of the circumferential outer wall for mechanical coupling to the annular seat of the turbomachine.

11. The seal structure of claim 1, wherein at least one of the first side wall and second side wall comprises swirl breakers formed on an outer surface thereof.

12. A turbomachine comprising:
   a casing;
   a shaft arranged for rotation in the casing; and
   a seal structure according to claim 1 adapted to provide a sealing action on the rotating shaft.

13. The seal structure of claim 1, wherein the sealing region comprises a plurality of teeth projecting from a radial inward surface of the sealing region towards the axis of the carrier ring.

14. The seal structure of claim 1, wherein the seal element comprises a plurality of teeth projecting at an angle relative to the center axis.

15. The seal structure of claim 1, wherein the seal element is made of a thermoplastic polymer.

16. The seal structure of claim 1, wherein the seal element includes a main body with an external cylindrical surface in surface contact with the bottom of the annular groove.

17. The seal structure of claim 1, wherein the circumferential outer wall comprises an annular projection extending from an outer peripheral surface of the circumferential outer wall, and wherein the annular projection has a cross-sectional shape that forms an undercut for mechanical coupling to the annular seat of the turbomachine.

18. A method for manufacturing a seal structure, the method comprising the following steps:
   inserting a seal element in an annular groove of a carrier ring, the annular groove being formed between a circumferential outer wall, a first side wall, and a second side wall of the carrier ring, the first side wall and the second side wall protruding radially inwardly from the circumferential outer wall towards a center axis of the carrier ring;
   mechanically coupling the seal element to the carrier ring with a first set of fastening pins and a second set of fastening pins, wherein the first set and the second set extend in opposing directions through an opening in the first side wall and the second side wall and penetrate into a corresponding recesses in the seal element, and wherein the seal element has a first region in surface-to-surface contact with the annular groove and a second region protruding from the annular groove of the carrier ring toward the center axis; and
   machining an inwardly facing surface of the second region of the seal element to produce a plurality of sealing teeth that form a labyrinth seal thereon.

19. The method of claim 18, wherein the step of mechanically coupling the seal element to the carrier ring further comprises the following steps after the seal element has been inserted in the annular groove of the carrier ring:
   machining a first set of holes through the first side wall and extending each hole of the first set of holes to form the recesses in the seal element; and
   machining a second set of holes through the second side wall and extending each hole of the second set of holes to form the recesses in the seal element.

20. The method of claim 18, further comprising the step of:
   machining an annular blank to form the annular groove between the circumferential outer wall, the first side wall, and the second side wall; and
   machining a plurality of through holes in at least one of the first side wall and second side wall.

21. The method of claim 20, wherein the step of machining the annular blank further comprises the step of:
   forming an annular projection projecting radially outwardly from an outer surface of the circumferential outer wall.

22. The method of claim 18, wherein the carrier ring comprises metal or metal alloy and the seal element comprises a thermoplastic polymer.

* * * * *